March 2, 1954
W. A. WALDIE
2,671,062
WRINKLE FINISH COATING COMPOSITION CONTAINING
A VINYL CHLORIDE-VINYL ACETATE-VINYL ALCOHOL
TERPOLYMER AND AN ALKYD RESIN
Filed Oct. 30, 1950
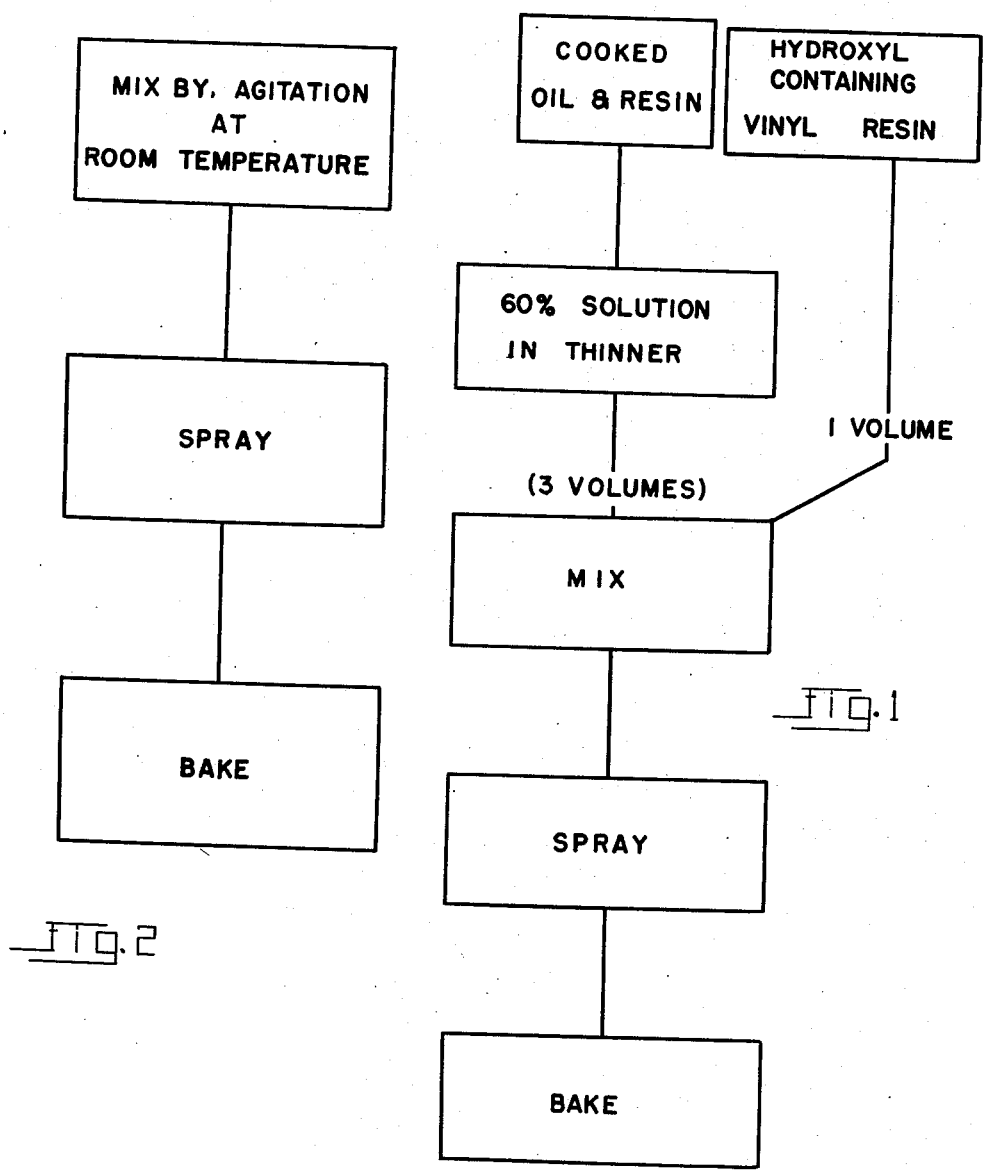
INVENTOR
WILLIAM A. WALDIE
BY
Toulmin & Toulmin
ATTORNEYS Patented Mar. 2, 1954

2,671,062

UNITED STATES PATENT OFFICE 2,671,062

WRINKLE FINISH COATING COMPOSITION CONTAINING A VINYL CHLORIDE-VINYL ACETATE-VINYL ALCOHOL TERPOLYMER AND AN ALKYD RESIN

William A. Waldie, Dayton, Ohio, assignor to New Wrinkle, Inc., Dayton, Ohio, a corporation of Delaware Application October 30, 1950, Serial No. 192,863

13 Claims. (Cl. 260—22)

This invention relates to wrinkle coating compositions and more particularly to a wrinkle coating composition containing Vinylite resins.

Vinylite resins are of several distinct basic types, known as the acetates, chlorides, chloracetates, butyrates, and each of these may be modified by the inclusion of acid components, such as maleic anhydride. The properties of each of these Vinylite resins vary as to solubility, viscosity in solution, the miscibility with oils, varnishes, other resins and alkyds, this latter factor being particularly pertinent in the formation of wrinkle coatings. As a general rule even a low concentration of a Vinylite resin in a solvent produces a viscous solution which can only be applied to surfaces to be coated with a doctor blade or a roll coater.

While the solvent utilized in the solution has a definite bearing on the viscosity of such a Vinylite resin solution even low viscosity solutions tend to feather when applied by spraying. Accordingly such Vinylite resins have not been considered satisfactory for the formation of wrinkle coatings and are particularly unsatisfactory where it is desired to spray the wrinkle coating.

It is accordingly a primary object of this invention to provide a wrinkle coating composition having a Vinylite resin contained therein and which can be readily sprayed.

It is a particular object of this invention to provide a wrinkle coating composition having a Vinylite resin contained therein and which results in a hard durable film on baking thereof.

It is an important object of this invention to provide a wrinkle coating composition having a Vinylite resin contained therein and which produces a film of fine uniform texture.

It is another object of this invention to provide a pigmented wrinkle coating composition having Vinylite resin contained therein and which does not discolor when subjected to baking temperatures.

It is a further object of this invention to provide a wrinkle coating composition having Vinylite resin contained therein and which does not have a tendency to sag when a mixture thereof is sprayed heavily.

It is another object of this invention to provide a process for the production of a wrinkle coating composition having a Vinylite resin contained therein.

These and other objects are accomplished by compounding a Vinylite resin containing a high percentage of hydroxyl group with an alkyd type resin having the property of wrinkling with drier.

It has been found that vinyl resins containing hydroxyl are well suited to overcome the defects present in the use of vinyl resins for wrinkling coating processes. A particularly suitable vinyl resin containing hydroxyl is marketed by The Bakelite Co. under the trade name "Vinylite VAGH" and contains approximately by weight:

| | Per cent |
|---|---|
| Vinyl chloride | 91 |
| Vinyl acetate | 3 |
| Hydroxyl (calculated as vinyl alcohol) | 6 |

This resin which is a terpolymer of vinyl chloride, vinyl acetate and vinyl alcohol will hereinafter be referred to as resin A.

Such a Vinylite resin as that described above when mixed with an alkyd resin having the property of wrinkling with drier results in a wrinkle coating having a hard durable film and improved resistance to discoloration.

One such type of alkyd resin is an oil extended modified alkyd resin dissolved to a 60% solution by weight in an aromatic thinner. Another such type of resin is a pure alkyd, that is, an unmodified alkyd resin. These types of resins will be referred to hereinafter more particularly.

In the accompanying drawing a flow sheet is presented which illustrates the various steps of the preferred methods of the process for making the coating composition of my invention.

The following examples taken in connection with the accompanying flow sheet may be considered as exemplary of the compositions and methods particularly employed in connection with the present invention.

Example I (a) A solution of Vinylite resin containing hydroxyl was first prepared by mixing under room temperature conditions with simple agitation, in parts by weight:

| | |
|---|---|
| Resin A | 50 |
| Toluol | 225 |
| Cyclohexanone | 225 |

The solution resulting from this mixture was of low viscosity. This solution will hereinafter be referred to as solution A.

(b) A cooked oil extended modified alkyd resin was then prepared by cooking together in parts by weight approximately:

|  | Per cent |
|---|---|
| Glycerine | 12.28 |
| Phthalic anhydride | 19.93 |
| Maleic anhydride | 1.15 |
| Linseed oil acid | 16.94 |
| Rosin | 23.12 |
| Tung oil | 26.58 |
| Total | 100 |

This resin will hereinafter be referred to as resin B. Resin B is employed as a 60% solution by weight in a thinner such as xylol. This solution of 40% xylol and 60% resin will hereinafter be referred to as solution B.

(c) In order to secure a varnish having a good wrinkle texture on baking, a wrinkling mixture was prepared by mixing the following components in parts by volume:

| Solution B | 3½ |
|---|---|
| Cobalt naphthenate, 6% | 1/16 |
| Toluol | 1 |

This wrinkling mixture will hereinafter be referred to as composition C. The wrinkling resin mix it will be noted contains an alkyd resin plus a drier and solvent.

(d) 3 parts by volume of this composition C were then mixed with 1 part by volume of solution A, set forth in paragraph (a) of this example, and a clear homogeneous solution was obtained which sprayed readily with no feathering and baked to a metal panel with a hard finish and a good wrinkling texture.

Example II (a) A solution of Vinylite resin containing hydroxyl was prepared in the following manner and proportions by weight:

| Resin A | 40 |
|---|---|
| Toluol | 80 |
| Cyclohexanone | 80 |

This composition will hereinafter be referred to as solution D.

(b) A wrinkling resin mixture was then prepared having the following parts by weight:

| Solution B | 235 |
|---|---|
| Cobalt naphthenate, 6% | 5 |
| Toluol | 60 |

This wrinkling composition will hereinafter be referred to as composition E.

(c) A blue paste was then prepared having the following parts by weight:

| Ultramarine blue | 9 |
|---|---|
| Titanium oxide | 1 |
| Magnesium silicate | 20 |
| Solution B | 45 |

(d) A pigmented Vinylite-alkyd composition was then made up containing the following:

| Blue paste | av. oz | 1 |
|---|---|---|
| Composition E | fl. oz | 3 |
| Solution D | fl. oz | 1 |
| Toluol | fl. oz | ½ |

This material sprayed readily and baked to a hard film with a coarse textured wrinkle.

Example III

Resin B was placed in solution to form solution B, as in Example I, and toluol and cyclohexanone were added to solution B, in the same relative proportions set forth in Example I. Then resin A was added directly to the resulting solution in the same proportion relatively as given in Example I, while agitating the solution at room temperature. This solution was clear, homogeneous, and sprayed readily without feathering and formed a hard film on baking. It is thus apparent that the necessity for forming a vinyl resin solution separate from that of the wrinkling resin may, if desired, be avoided.

Example IV (a) A solution of Vinylite resin containing hydroxyl (resin A) was formed by dissolving the resin in toluol and methyl ethyl ketone, while agitating at room temperature. The components were present in the same proportions as in Example I, the cyclohexanone being replaced by the methyl ethyl ketone in an equivalent amount by volume.

This solution, due to the presence of methyl ethyl ketone, is faster evaporating than the solution of resin A set forth in Example I, and is beneficial in that tendency to sag when sprayed heavy is substantially eliminated.

This composition will hereinafter be referred to as solution F.

(b) A wrinkling resin mixture was then prepared as in Example II, paragraph (b), that is, composition E.

(c) A blue paste was then prepared as in Example II, paragraph (c).

(d) A pigmented vinyl alkyd composition was then made up containing the following:

| Blue paste | av. oz | 1 |
|---|---|---|
| Composition E | fl. oz | 3 |
| Solution F | fl. oz | 1 |
| Toluol | fl. oz | ½ |

This mixture was agitated at room temperature and the resultant composition was sprayed. When sprayed with the use of suction a good uniform fine textured wrinkle was obtained.

Example V (a) A pure alkyd wrinkling resin composition was made up as follows:

|  | Per cent |
|---|---|
| Glycerine | 19.0 |
| Phthalic anhydride | 38.0 |
| Linseed oil acids | 21.5 |
| Tung oil | 21.5 |

This composition will hereinafter be referred to as resin G.

Resin G was dissolved to a 60% resin solution in xylol. This solution will be referred to hereinafter as solution K. In the resin and solution dehydrated castor oil or oiticica oil may be substituted for the tung oil and in equivalent proportions therefor.

(b) A wrinkling resin mixture was then prepared having the following parts by volume:

| Solution K | 63 |
|---|---|
| Cobalt naphthenate | 1 |
| Toluol | 16 |

This mixture yields a good wrinkle texture on baking, and will hereinafter be referred to as composition H.

(c) 3 parts by volume of composition H were then mixed with 1 part by volume of solution D, and 1 part by volume of toluol, and the resulting solution was sprayed and baked. A good uniform wrinkle texture was obtained upon spraying this material onto a backing and baking the same under infrared.

I have thus described several specific examples for the production of a wrinkling resin composition containing a vinyl resin which may be readily sprayed.

It will be understood by those skilled in the art that other modifications of my invention may be accomplished by proper selection of resins having certain properties, particularly those of miscibility and compatibility of vinyl solutions.

Also, it will be apparent to those skilled in the art that my invention is not limited to the specific examples of colored wrinkled finishes as set forth herein, but that substantially any color of wrinkle finish may be produced by my novel process.

It will further be understood that while there have been described herein certain specific embodiments of my invention, it is not intended thereby to have it limited to or circumscribed by the specific details given, in view of the fact that this invention is susceptible to various modifications and changes which come within the spirit of the invention and the scope of the appended claims.

I claim:

1. A wrinkling finish composition comprising a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of vinyl chloride vinyl acetate and vinyl alcohol, and solvent.

2. A wrinkling finish composition comprising a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of vinyl chloride, vinyl acetate and vinyl alcohol, a metal drier, and solvent.

3. A wrinkling finish composition comprising a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of vinyl chloride vinyl acetate and vinyl alcohol, cobalt naphthenate as a drier, and solvent.

4. A wrinkling finish composition comprising pigment, a wrinkling alkyd resin selected from the group consisting of (a) the alkyd obtained by cooking together by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of vinyl chloride, vinyl acetate and vinyl alcohol, and solvent.

5. A wrinkling finish composition comprising pigment, a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of vinyl chloride, vinyl acetate and vinyl alcohol, cobalt naphthenate as a drier, and solvent.

6. A wrinkling finish composition comprising a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of vinyl chloride, vinyl acetate and vinyl alcohol, and toluol as solvent.

7. A wrinkling finish composition comprising a wrinkling alkyd resin selected from the group consisting of (a) the alkyd obtained by cooking together, by weight, about 19.0% glycerine, about 38.0% phthalic anhydride, about 21.5% linseed oil acids, about 21.5% tung oil; and (b) the alkyd obtained by cooking together, by weight about 12.28% glycerine, about 19.93% phthalic anhydride about 1.15% maleic anhydride, about 16.94% linseed oil acids, about 23.12% rosin and about 26.58% tung oil; a terpolymer of, by weight, about 91% vinyl chloride, about 3% vinyl acetate and about 6% vinyl alcohol, and a solvent.

8. A wrinkling finish composition comprising pigment, a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil; a terpolymer of, by weight, about 91% vinyl chloride, about 3% vinyl acetate and about 6% vinyl alcohol, a metal drier, and a solvent.

9. A wrinkling finish composition comprising a wrinkling alkyd resin obtained by cooking together, by weight, about 19.0% glycerine, about 38.0% phthalic anhydride, about 21.5% linseed oil acids and about 21.5% tung oil, a terpolymer of vinyl chloride, vinyl acetate and vinyl alcohol, and solvent.

10. A wrinkling finish composition comprising a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil, a terpolymer of vinyl chloride, vinyl acetate and vinyl alcohol, and solvent.

11. The method of making a wrinkling finishing composition which comprises mixing a wrinkling alkyd resin selected from the group consisting of (a) the alkyd obtained by cooking together, by weight, about 19.0% glycerine, about 38.0% phthalic anhydride, about 21.5% linseed oil acids, and about 21.5% tung oil; and (b) the alkyd obtained by cooking together, by weight, about 12.28% glycerine, about 19.93% phthalic anhydride, about 1.15% maleic anhydride, about 16.94% linseed oil acids, about 23.12% rosin and about 26.58% tung oil, with a solvent therefor, mixing the solution thus obtained with pigment to form a paste, and combining the paste with a solution of a terpolymer of vinyl chloride, vinyl acetate and vinyl alcohol, a solution of the alkyd containing a metallic drier, and with sufficient additional solvent to obtain a sprayable wrinkling finish coating composition.

12. The method of making a wrinkling finish composition which comprises mixing a wrinkling alkyd resin obtained by cooking together, by weight, about 19.0% glycerine, about 38.0% phthalic anhydride, about 21.5% linseed oil acids, and about 21.5% tung oil, with a solvent therefor, mixing the solution thus obtained with pigment to form a paste, and combining the paste with a solution of a terpolymer of vinyl chloride, vinyl acetate and vinyl alcohol, a solution of the alkyd containing a metal drier, and with sufficient additional solvent to obtain a sprayable wrinkling finish coating composition.

13. The method of making a wrinkling finish composition which comprises mixing a wrinkling alkyd resin obtained by cooking together, by weight, about 12.28% glycerine, about 19.93% phthalic anhydride, about 1.15% maleic anhydride, about 16.94% linseed oil acids, about 23.12% rosin and about 26.58% tung oil with a solvent therefor, mixing the solution thus obtained with pigment to form a paste, and combining the paste with a solution of a terpolymer of vinyl chloride, vinyl acetate and vinyl alcohol, a solution of the wrinkling alkyd containing a metallic drier, and with sufficient additional solvent to obtain a sprayable composition.

WILLIAM A. WALDIE.

References Cited in the file of this patent

UNITED STATES PATENTS

| Number | Name | Date |
|---|---|---|
| 1,893,611 | Bradley | Jan. 10, 1933 |
| 1,954,835 | Stauffer | Apr. 17, 1934 |
| 2,512,726 | Penn et al. | June 27, 1950 |